(12) United States Patent
Neilson et al.

(10) Patent No.: US 9,778,081 B2
(45) Date of Patent: Oct. 3, 2017

(54) FLOW METER

(71) Applicant: Cameron International Corporation, Houston, TX (US)

(72) Inventors: Thomas Neilson, Duncan, OK (US); Gordon Vincent, Duncan, OK (US); Treyton Drake, Duncan, OK (US); Omar M. Kabir, Waller, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 14/942,403

(22) Filed: Nov. 16, 2015

(65) Prior Publication Data
US 2017/0138772 A1 May 18, 2017

(51) Int. Cl.
*G01F 15/00* (2006.01)
*G01F 1/05* (2006.01)
*G01F 15/14* (2006.01)
*F03B 1/02* (2006.01)
*F01D 5/02* (2006.01)
*F16C 3/02* (2006.01)

(52) U.S. Cl.
CPC .............. *G01F 1/053* (2013.01); *F01D 5/02* (2013.01); *F03B 1/02* (2013.01); *F16C 3/02* (2013.01); *G01F 15/14* (2013.01); *F05D 2240/60* (2013.01)

(58) Field of Classification Search
CPC ....................................................... G01F 15/00
USPC .......................................... 73/861.77–861.79
See application file for complete search history.

(56) References Cited

U.S. PATENT DOCUMENTS

| 4,282,883 | A | * | 8/1981 | Yerushalmy | A61B 5/09 |
| | | | | | 600/539 |
| 5,014,552 | A | | 5/1991 | Kamiunten et al. | |
| 5,182,952 | A | | 2/1993 | Pyzik | |
| 6,220,832 | B1 | * | 4/2001 | Schob | A61M 1/101 |
| | | | | | 417/423.5 |
| 6,250,167 | B1 | * | 6/2001 | Peace | G01F 1/115 |
| | | | | | 204/606 |
| 6,898,987 | B1 | | 5/2005 | Hayman | |

(Continued)

FOREIGN PATENT DOCUMENTS

WO            9956092 A1       11/1999

OTHER PUBLICATIONS

Woodworth, Inc., "Nanowear Resist Erosion and Abrasion in Pipelines Oil and Gas Industry", Nov. 11, 2015, found at https://web.archive.org/web/20150315140838/http://www.woodworthheattreating.com/nanowear.html, (2 pages).

(Continued)

*Primary Examiner* — Jewel V Thompson
(74) *Attorney, Agent, or Firm* — Chamberlain Hrdlicka

(57) ABSTRACT

A paddle wheel flow meter designed for measuring the flow rate of a viscous or debris-laden fluid with fewer parts, higher durability and simplicity of servicing. The flow meter includes a housing including a flow bore and an insert body with an integral rotor shaft. The insert body is removably insertable into the housing. A rotor includes rotor blades and is attached to the rotor shaft so as to be at least partially located in the flow bore such that flow of the fluid causes the rotor to rotate. A sensor unit generates a signal indicative of the rotational rate of the rotor, which can be used to determine the flow rate of the fluid.

20 Claims, 5 Drawing Sheets

(56) References Cited

U.S. PATENT DOCUMENTS

| | | | |
|---|---|---|---|
| 9,086,305 B2 | 7/2015 | Nelson | |
| 9,095,428 B2 * | 8/2015 | Kabir | A61F 2/24 |
| 2010/0300213 A1 | 12/2010 | Fink et al. | |
| 2011/0162446 A1 | 7/2011 | Delatorre | |
| 2014/0326075 A1 | 11/2014 | Nelson | |

OTHER PUBLICATIONS

ITT Barton Instruments, "Installation and Operation Manual Models 7511 & 7518 Rim Drive Meters", 1984, ITT Corporation, (12 pages).

International Search Report and Written Opinion dated Feb. 27, 2017, for PCT Application No. PCT/US2016/060866, dated Nov. 7, 2016.

* cited by examiner

FLOW METER

BACKGROUND

This section is intended to provide background information to facilitate a better understanding of the various aspects of the described embodiments. Accordingly, it should be understood that these statements are to be read in this light and not as admissions of prior art.

Flow meters measure the volumetric flow rate of a fluid within a pipeline. Some flow meters employ a rotor suspended in the fluid's path. Flowing fluid causes the rotor to rotate. Measuring the rotor's resulting rotation indicates the fluid's flow rate. Typical rotors have paddlewheel, turbine, or Pelton-wheel designs.

BRIEF DESCRIPTION OF THE DRAWINGS

For a detailed description of the embodiments of the invention, reference will now be made to the accompanying drawings in which.

DETAILED DESCRIPTION

This disclosure provides a method and apparatus for measuring a flow rate of a fluid, including a paddlewheel flow meter that is designed for measuring the flow rate of a viscous or debris-laden fluid in harsh environments.

Fluids transported via pipeline can be viscous (e.g., heavy crude oil, viscous hydrocarbon fluids, or cement) or laden with debris (e.g., shale oil or gas having sand, rocks, or other debris). Flow meters with flow vanes or turbine rotors can restrict the flow of these viscous or debris-laden fluids. For instance, turbine rotors are fully submerged in the fluid's flow path, increasing contact between the flow and the rotor's blades and, in turn, potentially restricting the fluid flow. In addition, large debris may clog or constrict the flow through a turbine rotor. Flow meters with a paddlewheel rotor can reduce flow disturbance because only a portion of the paddlewheel is submerged in the flow.

Flow meters may be used in harsh environment conducive to erosion, corrosion, degradation, or deterioration, and may encounter debris-laden (e.g., shale oil having sand debris) or corrosive (high salinity) fluids. This increases the frequency at which the paddlewheel rotor and shaft can benefit from repair, replacement, or cleaning. To facilitate repair, cleaning, or replacement, the flow meter can include a port in the housing that provides access to these components without having to remove associated sensor components, and provides an access hole to clean or unclog the flow meter or pipeline. In addition, to reduce its number of components, the flow meter can include a rotor shaft integrated into a body for positioning the rotor in the fluid flow. Constructing the shaft and body from a single piece of material can simplify the flow meter's manufacturing process.

Figure 1A:
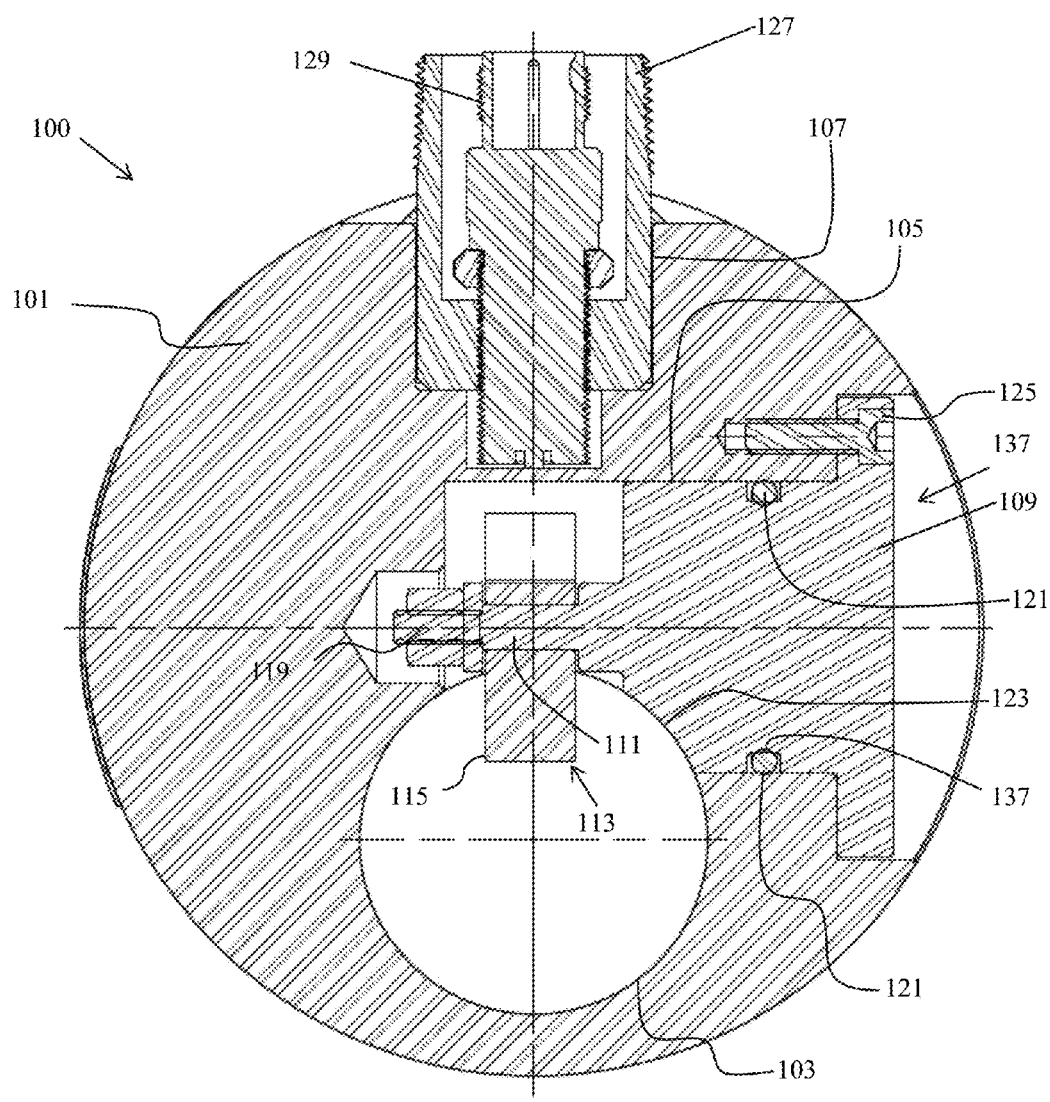
FIGS. 1A-B are cross-sections of an example flow meter, according to one or more embodiments.
Figure 1B:
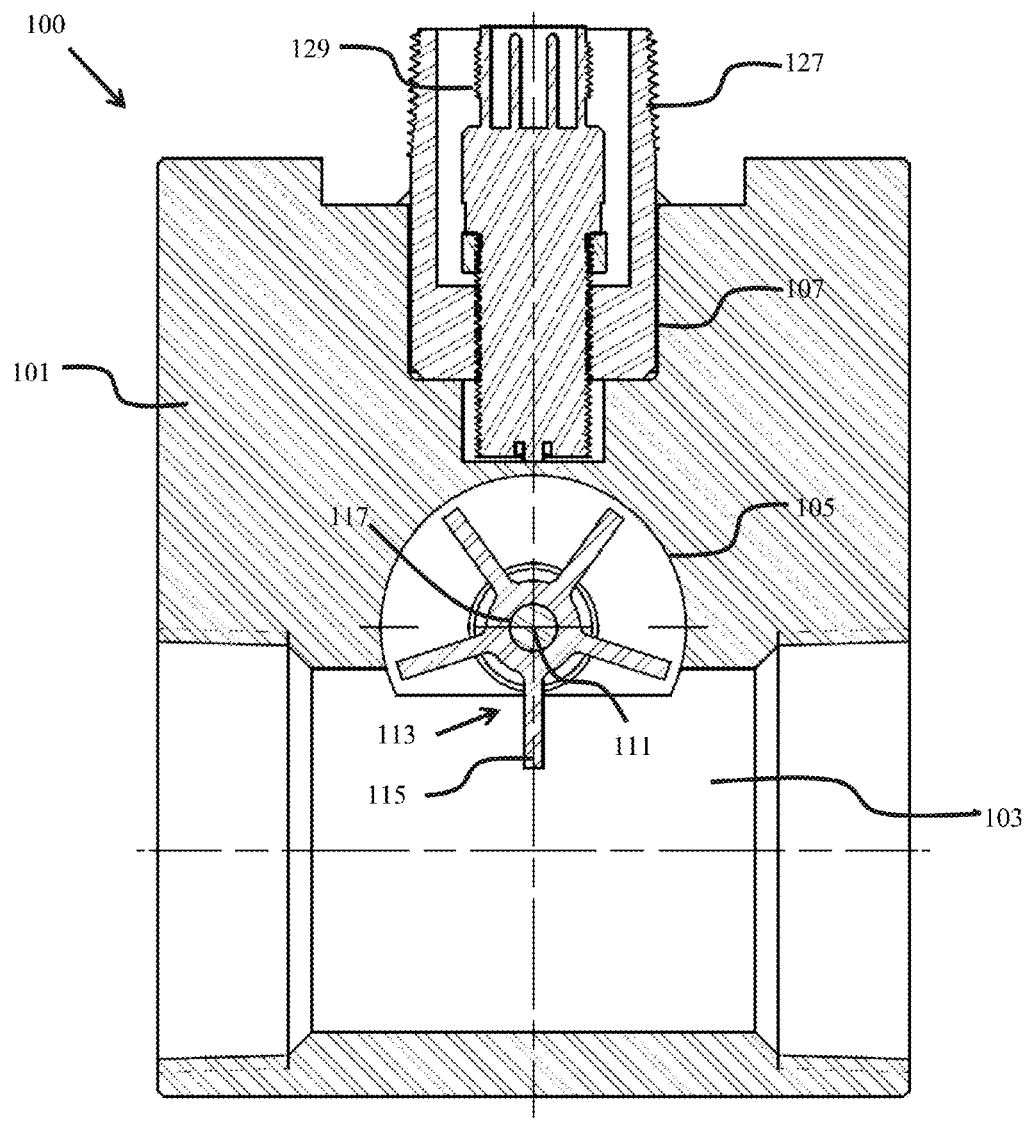
Figure 1C:
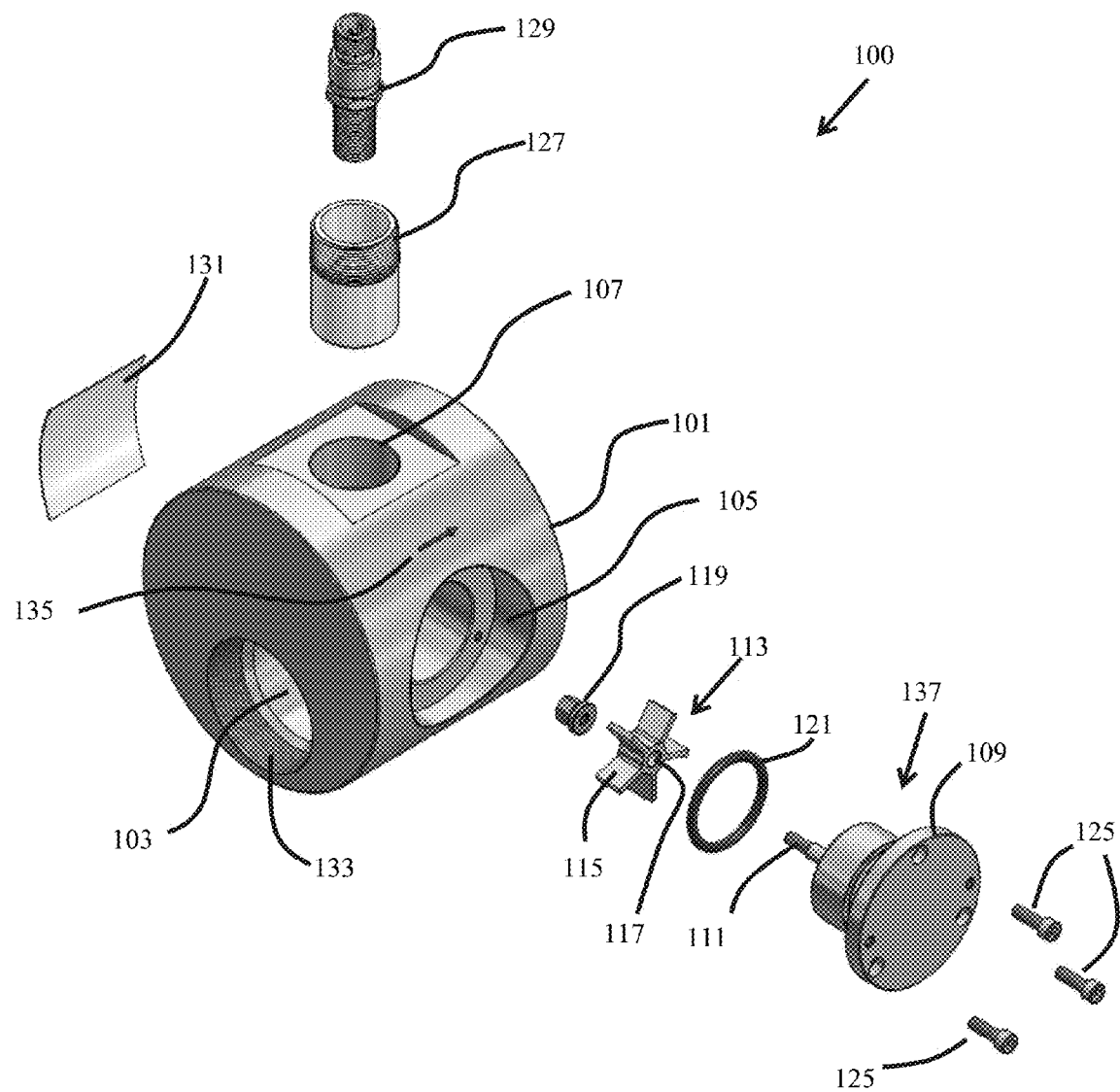
FIG. 1C depicts the example flow meter of FIGS. 1A-B, according to one or more embodiments.

FIGS. 1A-C depict an embodiment of a flow meter 100 comprising a housing 101 that holds a rotor 113 and a sensor unit 129 associated with the rotor 113. The rotor 113 may be any suitable rotor, for example a paddlewheel. The flow meter 100 may have separate ports 105, 107 to access the rotor 113 and the sensor unit 129, respectively, or the sensor unit 129 and the rotor 113 may be installed in a single port (not shown).

Referring to FIGS. 1A and 1B (depicting cross-sections of the flow meter 100), the housing 101 includes a flow bore 103, and the flow rate of fluid through it can be measured using the rotor 113. A rotor fastener 119 (e.g., a flanged nut) secures the rotor 113 to a rotor shaft 111. The rotor 113 is rotatably coupled to the rotor shaft 111. The rotor 113 includes a bore 117 (shown in FIG. 1B) that receives the shaft 111 and that allows the rotor 113 to rotate around the rotor shaft 111. The rotor 113 includes one or more rotor blades 115, which are illustrated as paddles on a paddlewheel rotor. As illustrated, only a portion of the rotor 113 is located in the flow bore 103. The positioning of the rotor 113 may be selected so as to minimize disturbance of the flow of the fluid through the flow bore 103. As one non-limiting example, the rotor 113 may be positioned such that the rotor shaft 111 is not in the flow bore 103 and at least one blade of the blades 115 is only partially in the flow bore 103.

The rotor 113 is shown positioned centrally (radially as illustrated in FIG. 1A and longitudinally as illustrated in FIG. 1B) at the upper boundary of the flow bore 103. Alternatively, the rotor 113 may be positioned anywhere in the flow bore 103 to suitably determine the flow rate of the fluid. As examples, the rotor 113 may be positioned centrally (radially and longitudinally) at the lower boundary of the flow bore 103. In embodments, the rotor 113 may be radially shifted to the right or left of center of the flow bore 103 relative to the position shown in FIG. 1A.

The illustrated flow meter 100 includes a removable rotor assembly 137 including an insert body 109. The rotor shaft 111 is integral to the insert body 109, which is removably insertable into the housing 101. The rotor shaft 111 and the insert body 109 can be constructed from the same piece of material, with the rotor shaft 111 forming a cantilever extension from the insert body 109. That is, the rotor shaft 111 and the insert body 109 form a single unified body constructed from the same block of material such that the rotor shaft 111 is an extension of the insert body 109. The rotor shaft 111 can be configured to mate with a rotor fastener 119 to fasten the rotor 113 to the rotor shaft 111. For example, the rotor shaft 111 can be partially threaded to receive the rotor fastener 119 and partially smooth to allow the rotor 113 to rotate around the rotor shaft 111.

The insert body 109 and rotor shaft 111 can include a metallic material. The surface of the metallic material can be hardened by changing a molecular structure of the surface through thermal chemical diffusion using at least one diffusion substance. As an example, the diffusion substance can include at least one gas or chemical (e.g., nitrogen) that hardens or enhances the erosive resistance of the metallic material. The thermally diffused metallic material can retain the ductility of the base metallic material without becoming brittle. Retaining its ductility, the hardened metallic material can resist cracking. The thermally diffused metallic material may be hardened when a hardness of the diffusion zone of the metallic material increases according to a hardness scale (e.g., Rockwell hardness of 10, 20, 30 or 40 or higher Rockwell C scale) relative to the hardness of the metallic material before undergoing the thermal chemical diffusion process. The resulting hardness of the thermally diffused metallic material can depend on the diffusion temperature or the amount of time the metallic material is exposed to the thermal chemical diffusion process. The diffusion zone can be a pre-determined molecular layer of the metallic material that extends from the surface of the metallic material to a pre-determined molecular depth. The thermally diffused metallic material can include a steel alloy (e.g., SAE 4140 steel) or any other suitable ferrous material. The thermally diffused metallic material can be molecularly altered using a thermal chemical diffusion process referred to as NANOWEAR® available from Woodworth, Inc. of Flint, Mich.

The thermal chemical diffusion process can also enhance the corrosive resistance of the metallic material. The diffusion substance can also include at least one gas or chemical (e.g., nitrogen) that enhances the corrosive resistance of the metallic material. The thermally diffused metallic material can resist corrosion caused by salt water or seawater. Enhancing the corrosive resistance of the metallic material can allow it to resist corrosion from salt water for at least 60 days or longer of continuous exposure to salt water. Enhancing the corrosive resistance of the metallic material can include resisting a galvanic corrosion reaction in presence of seawater or other dielectric metallic materials for at least 60 days or longer. Thus, the insert body can include a thermally diffused metallic material configured to provide resistance to at least one of erosion, corrosion, and cracking.

Any suitable components included in the flow meter 100 may be molecularly altered using a thermal chemical diffusion process suitable to enhance their resistance to erosion, corrosion, or cracking. As an example, the housing 101 can be molecularly altered using a thermal chemical diffusion process suitable to enhance its resistance to erosion, corrosion, or cracking.

The insert body 109 and the rotor shaft 111 extending from the insert body 109 may be formed using additive manufacturing. One example of an additive manufacturing process melts ultra-thin layers of a metallic material according to the desired shape of the insert body using a high-precision laser. An ultra-thin layer can include a layer that is less than or about 20 micrometers thick. This layer is formed using powder-based metallurgical techniques from known metallic materials which are suitable for multiple purposes, such as (a) corrosion resistance against most acidic and alkalinic chemical fluids, and (b) thermal chemical diffusion. A metallic material with suitable multiple purposes includes a steel alloy. Additive manufacturing can provide a reduction in cycle time (i.e., production lead time) due to its potential to manufacture multiple components simultaneously. Any of the components included in the flow meter 100 may be formed using additive manufacturing, subtractive manufacturing, or any other suitable manufacturing process to construct the components.

The insert body 109 can optionally include an arcuate surface 123 with a radius of curvature that matches with the inner surface of the flow bore 103. A seal 121 fits around the insert body 109 in an annular groove 137 to prevent fluid leakage between the insert body 109 and the flow bore 103. The insert body 109 may include other annular grooves 137 to fit other seals 121. One or more fasteners 125 may secure the insert body 109 to the housing 101 in the insert port 105. In other embodiments, the insert body 109 may be threaded into or otherwise appropriately connected with the housing 101.

The insert body 109 inserts into the housing 101 through an insert port 105. To easily repair, clean, or replace components susceptible to erosion, corrosion, degradation, or deterioration, the insert body 109 may be removed from the housing to provide access to the rotor 113, rotor shaft 111, rotor fastener 119, seal 121, insert body 109, or other components of the flow meter 100. In situations where the rotor shaft 111 is worn, the entire insert body 109 may be replaced. In situations where the rotor blades 115 and/or rotor 113 are worn, the rotor 113 may be replaced. Similarly, other components, such as the rotor fastener 119 or seal 121, may be repaired, cleaned, or replaced. These components may be repaired, cleaned, or replaced by removing the insert body 109 from the housing 101 without having to remove or disconnect the sensor unit 129.

As the fluid flows through the flow bore 103, the fluid rotates the rotor 113 around the rotor shaft 111. A sensor unit 129, for measuring the rotation of the rotor 113, is located within the housing 101 through a sensor port 107. The sensor port 107 may be isolated from the flow bore 103 to prevent fluid from accessing the sensor unit 129. In the example shown, the sensor unit 129 includes a magnetic sensor configured to detect the rotational rate of the rotor 113, which may comprise a magnetically detectable material such as a steel alloy. The sensor unit 129 generates a signal indicative of the rotational rate of the rotor 113, which, combined with the known dimensions of the rotor 113, blades 115, and flow bore 103 or through testing, can be used to determine the flow rate of the fluid through the flow bore 103. A processor (not shown) may be in communication with the sensor unit 129 and configured to determine the flow rate of the fluid passing through the flow bore 103 using the signal generated by the sensor unit 129. Optionally, the sensor unit 129 may be attached to the housing 101 within a sensor conduit 127.

FIG. 1C depicts the flow meter 100 of FIGS. 1A-B in an exploded view. The flow bore 103 may include internal threads 133 configured to mate with and receive a flow pipe (e.g., pipes 301 of FIG. 3). The housing 101 may have an arrow 135 stamped or printed on the exterior of the housing 101 to indicate a preferred direction that fluid flows through the flow bore 103 for purposes of installing, repairing, or replacing the flow meter 101. Also, the housing may have a name plate 131 to identify the characteristics of the flow meter 100, such as diameter, identification number, model number, or other identifying characteristics.

Figure 2:
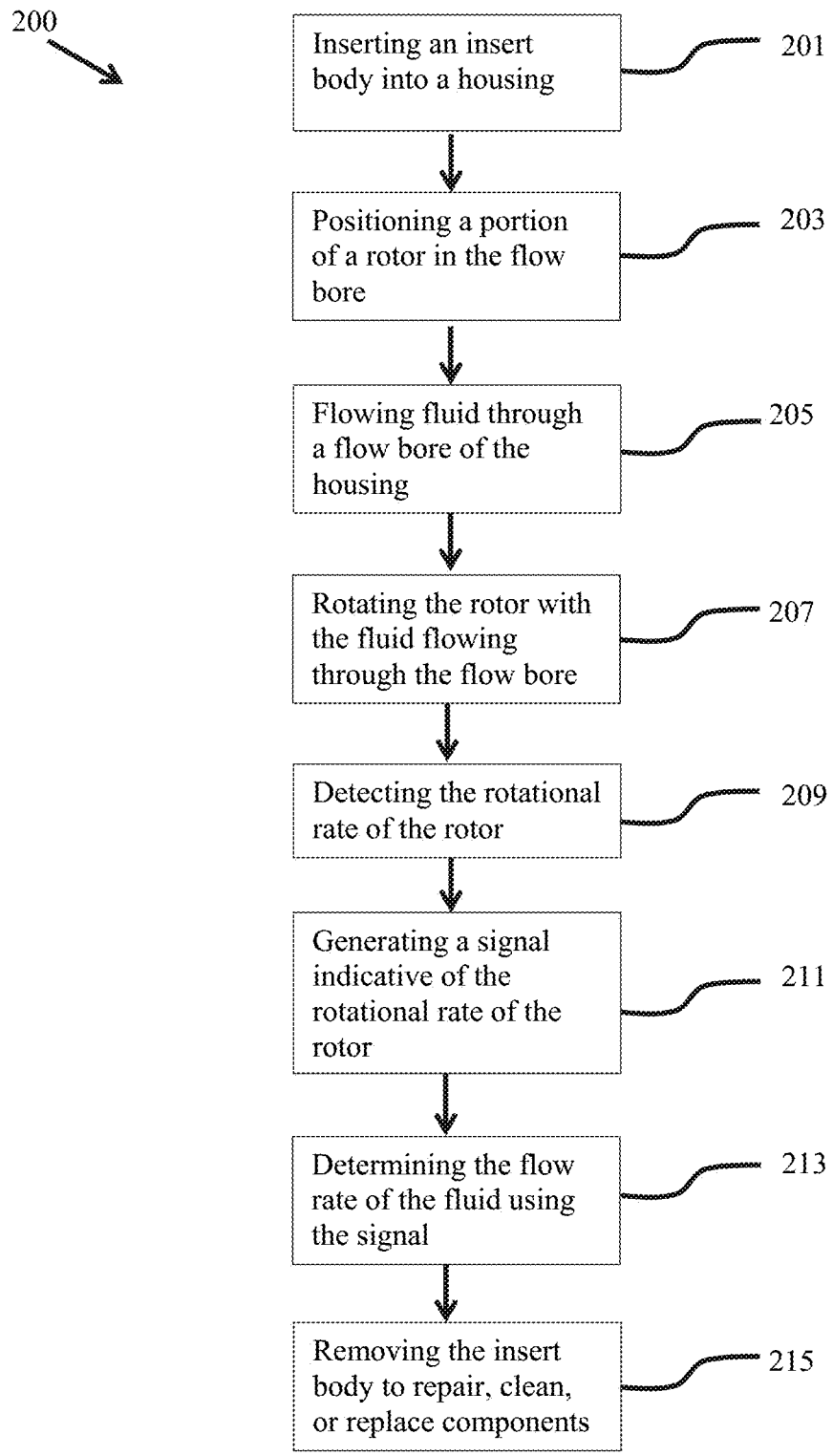
FIG. 2 depicts a method for determining a flow rate of a fluid, according to one or more embodiments.

FIG. 2 is a flowchart of an example of a method 200 for determining a flow rate of a fluid according to one or more embodiments. In step 201, the insert body 109 is inserted into the housing 101 of the flow meter 100 through insert port 105 without having to arrange the sensor unit 129 into the housing 101. In step 203, a portion of the rotor 113 is positioned in the flow bore 103 according to the position of the rotor 113 on the insert body 109. In other embodiments, a portion of the rotor 113 can be positioned in the flow bore 103 to minimize disturbance of the fluid flow. In step 205, the fluid flows through the flow bore 103 of the housing in step 205. In step 207, the fluid rotates the rotor 113 as the fluid passes through the flow bore 103 of the housing 101. The sensor unit 129 detects the rotational rate of the rotor 113 based on when a blade 115 of the rotor 113 moves past the sensor unit (step 209). In step 211, the sensor unit 129 generates a signal indicative of the rotational rate of the rotor 113. The sensor unit 129 is in communication with at least one processor (not shown) that is configured to determine the flow rate of the fluid using the signal indicative of the rotational rate of the rotor 113 (step 213). In step 215, the insert body 109 can be removed from the housing 101 to repair, clean, or replace the insert body 109 or any other components of the flow meter 100 made accessible by removing the insert body 103 without having to remove or disconnect the sensor unit 129. For example, in step 215, the insert body may be repaired, cleaned, or replaced without removing the sensor unit 129.

Figure 3:
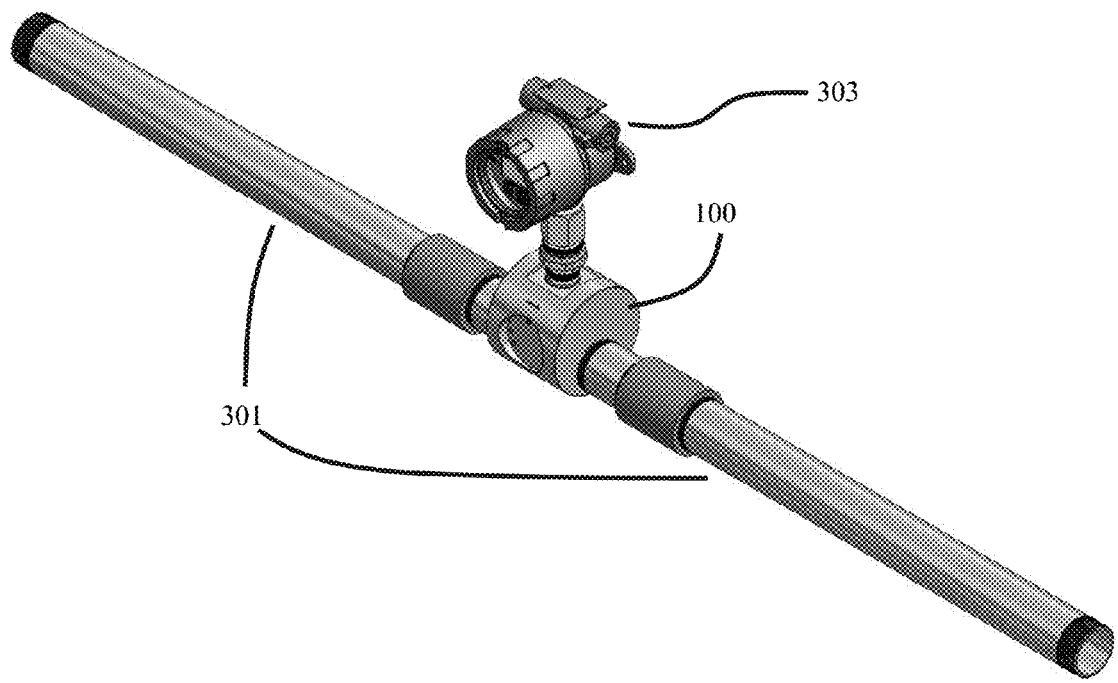
FIG. 3 depicts the example flow meter of FIGS. 1A-C in-line with a pipe, according to one or more embodiments.

FIG. 3 depicts the example flow meter 100 in-line with pipes 301, according to one or more embodiments. The flow meter 100 is coupled between pipes 301 allowing a fluid to flow through the pipes 301 and the flow meter 100 to measure the volumetric fluid flow rate of the fluid. The fluid flowing through pipes 301 and flow meter 100 can include a hydrocarbon fluid, coal bed methane, shale oil, heavy crude, cement, a viscous fluid, a debris-laden fluid, or any other fluid. The flow meter 100 is equipped with a display and processing unit 303 to determine, display, or store the flow rate of the fluid based on the rotational rate detected by the sensor unit 129. The display and processing unit 303 can be in communication with the senor unit 129 to receive and process the signal generated by the sensor unit 129. The display and processing unit 303 includes at least one processor configured to determine the flow rate of the fluid.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A flow meter for determining a flow rate of a fluid, comprising:
   a housing comprising a flow bore;
   an insert body comprising an integral rotor shaft, the insert body being removably insertable into the housing;
   a rotor attached to the rotor shaft and comprising rotor blades, the rotor being at least partially located in the flow bore such that flow of the fluid causes the rotor to rotate; and
   a sensor unit configured to generate a signal indicative of a rotational rate of the rotor, which can be used to determine the flow rate of the fluid.

2. The flow meter of claim 1, wherein the rotor comprises a paddlewheel located at least partially in the flow bore and rotatable around the rotor shaft.

3. The flow meter of claim 1, wherein the insert body comprises a thermally diffused metallic material.

4. The flow meter of claim 1, wherein the insert body comprises a metallic material comprising a hardened surface, hardened by changing a molecular structure of the hardened surface through thermal chemical diffusion of at least one diffusion substance.

5. The flow meter of claim 4, wherein the metallic material comprises a steel alloy and has a hardness of 10 to 40 by the Rockwell C scale.

6. The flow meter of claim 1, wherein the insert body and the integral rotor shaft are formed by additive manufacturing.

7. The flow meter of claim 1, further comprising:
   at least one fastener configured to attach the insert body to the housing.

8. The apparatus of claim 1, wherein the rotor shaft is configured to receive at least one rotor fastener that couples the rotor to the rotor shaft.

9. A method for determining a flow rate of a fluid, comprising:
   inserting an insert body comprising an integral rotor shaft into a housing;
   flowing the fluid through a flow bore of the housing;
   rotating a rotor comprising rotor blades with the fluid flowing through the flow bore, wherein the rotor is attached to the integral rotor shaft;
   detecting a rotational rate of the rotating rotor;
   generating a signal indicative of the rotational rate of the rotor; and
   determining the flow rate of the fluid using the signal.

10. The method of claim 9, further comprising replacing the insert body without removing a sensor unit located in the housing.

11. The method of claim 9, wherein the rotor comprises a paddlewheel at least partially located in the flow bore.

12. The method of claim 9, wherein the insert body comprises a thermally diffused metallic material configured to provide resistance to at least one of erosion, corrosion, and cracking.

13. The method of claim 9, wherein the insert body comprises a metallic material comprising a hardened surface, hardened by changing a molecular structure of the hardened surface through thermal chemical diffusion of at least one diffusion substance.

14. The method of claim 13, wherein the metallic material comprises a steel alloy and has a hardness of 10 to 40 by the Rockwell C scale.

15. The method of claim 9, wherein the insert body and the integral rotor shaft are formed by additive manufacturing reducing cycle times in manufacturing the insert body and the integral rotor shaft.

16. The method of claim 9, further comprising:
    positioning a portion of the rotor in the flow bore to minimize disturbance of the flow of the fluid through the flow bore.

17. The method of claim 9, wherein the fluid comprises a hydrocarbon fluid.

18. A rotor shaft assembly for positioning a rotor in a flow meter housing, comprising:
    an insert body comprising an integral rotor shaft, the insert body being removably insertable into the flow meter housing.

19. The rotor shaft assembly of claim 18, wherein the insert body comprises a metallic material comprising a hardened surface, hardened by changing a molecular structure of the hardened surface through thermal chemical diffusion of at least one diffusion substance.

20. The rotor shaft assembly of claim 18, wherein the insert body comprises a metallic material having a hardness of 10 to 40 by the Rockwell C scale.

* * * * *